United States Patent
Hung et al.

(10) Patent No.: US 9,843,253 B2
(45) Date of Patent: Dec. 12, 2017

(54) VOLTAGE CONVERTER AND VOLTAGE CONVERTING METHOD

(71) Applicant: DELTA ELECTRONICS, INC., Taoyuan Hsien (TW)

(72) Inventors: Hsien-Feng Hung, Taoyuan Hsien (TW); Yi-Lan Yang, Taoyuan Hsien (TW); Chung-Ping Ku, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 290 days.

(21) Appl. No.: 14/483,948

(22) Filed: Sep. 11, 2014

(65) Prior Publication Data

US 2015/0357902 A1 Dec. 10, 2015

(30) Foreign Application Priority Data

Jun. 5, 2014 (TW) .............................. 103119473 A

(51) Int. Cl.
*H02M 7/217* (2006.01)
*H02M 1/14* (2006.01)
(Continued)

(52) U.S. Cl.
CPC ............. *H02M 1/14* (2013.01); *H02M 1/082* (2013.01); *H02M 1/081* (2013.01); *H02M 7/217* (2013.01);
(Continued)

(58) Field of Classification Search
CPC ...... H02M 5/40; H02M 5/458; H02M 5/4585; H02M 7/42; H02M 7/48; H02M 7/487;
(Continued)

(56) References Cited

U.S. PATENT DOCUMENTS

| | | | | |
|---|---|---|---|---|
| 5,686,768 A | * | 11/1997 | Thomsen | H02J 9/062 307/64 |
| 6,075,350 A | * | 6/2000 | Peng | H02J 3/1814 323/207 |
| 2004/0076027 A1 | * | 4/2004 | Wu | H02M 3/1584 363/65 |
| 2005/0110474 A1 | | 5/2005 | Ortiz et al. | |
| 2005/0275387 A1 | | 12/2005 | Mitier et al. | |
| 2007/0242486 A1 | * | 10/2007 | Moromizato | H02M 3/33592 363/21.06 |
| 2008/0205095 A1 | * | 8/2008 | Pinon | H02M 3/1584 363/39 |
| 2009/0189578 A1 | | 7/2009 | Chen et al. | |
| 2012/0169310 A1 | | 7/2012 | Dearborn et al. | |
| 2014/0347029 A1 | * | 11/2014 | Daub | H02M 3/156 323/282 |

(Continued)

FOREIGN PATENT DOCUMENTS

| | | |
|---|---|---|
| CN | 103378726 | 10/2013 |
| TW | I306326 | 2/2009 |

(Continued)

*Primary Examiner* — Timothy J Dole
*Assistant Examiner* — Bryan R Perez
(74) *Attorney, Agent, or Firm* — Hauptman Ham, LLP

(57) ABSTRACT

A voltage converter includes a voltage conversion circuit, a pulse width modulation (PWM) signal generating module, a feedback controlling module, and a subtractor. The voltage conversion circuit is configured to convert an input voltage to an output voltage according to a PWM signal. The PWM signal generating module is configured to generate the PWM signal according to a control signal. The feedback controlling module is configured to generate the control signal according to a feedback signal. The subtractor is configured to subtract a first reference voltage by the output voltage, to generate the feedback signal. The phase of an AC component of the first reference voltage is substantially opposite to the phase of the input voltage.

17 Claims, 6 Drawing Sheets

(51) Int. Cl.
   *H02M 1/00* (2006.01)
   *H02M 1/08* (2006.01)
   *H02M 7/219* (2006.01)

(52) U.S. Cl.
   CPC .......... *H02M 7/219* (2013.01); *H02M 7/2173* (2013.01); *H02M 2001/0003* (2013.01); *H02M 2001/0025* (2013.01)

(58) Field of Classification Search
   CPC .... H02M 7/493; H02M 7/501; H02M 7/4826; H02M 7/49; H02M 7/4807; H02M 7/537; H02M 7/5387; H02M 2007/4803; H02M 2007/4822
   USPC ..... 363/97, 98, 131, 132, 65, 71, 72, 35–37, 363/135, 136, 137
   See application file for complete search history.

(56) References Cited

U.S. PATENT DOCUMENTS

2015/0326131 A1* 11/2015 Zhu ................... H02M 1/4258
                                                            363/21.16

FOREIGN PATENT DOCUMENTS

TW         201304380         1/2013
WO     WO 2012076457 A1 *  6/2012   ............ H02M 3/156

* cited by examiner

VOLTAGE CONVERTER AND VOLTAGE CONVERTING METHOD

RELATED APPLICATIONS

This application claims priority to Taiwan Application Serial Number 103119473, filed Jun. 5, 2014, which is herein incorporated by reference.

BACKGROUND

Technical Field

The present disclosure relates to an electronic device. More particularly, the present disclosure relates to a voltage converter and a voltage converting method.

Description of Related Art

With advances in technology, voltage converters have been widely used in various kinds of electronic devices.

A typical voltage converter has an input end and an output end. The voltage converter can convert an input voltage with a voltage level on the input end to an output voltage with another voltage level on the output end. In the voltage conversion process, a ripple voltage with a frequency and a phase identical to a frequency and a phase of the input voltage is usually generated on the output end, and such a ripple voltage may cause operational instability of back end circuits which are electrically connected to the output end.

Thus, a method to eliminate the ripple voltage on the output end is desired.

SUMMARY

One aspect of the present disclosure is related to a voltage converter. In accordance with one embodiment of the present disclosure, the voltage converter includes a voltage conversion circuit, a pulse width modulation signal generating module, a feedback controlling module, and a subtractor. The voltage conversion circuit is configured to receive a pulse width modulation signal and convert an input voltage to an output voltage according to the pulse width modulation signal. The pulse width modulation signal generating module is electrically connected to the voltage conversion circuit. The pulse width modulation signal generating module is configured to receive a control signal and generate the pulse width modulation signal according to the control signal. The feedback controlling module is electrically connected to the pulse width modulation signal. The feedback controlling module is configured to receive a feedback signal and generate the control signal according to the feedback signal. The subtractor is electrically connected to the voltage conversion circuit and the feedback controlling module. The subtractor is configured to receive a first reference signal and the output voltage, and subtract the first reference voltage by the output voltage to generate the feedback signal. A phase of an AC component of the first reference voltage is substantially opposite to a phase of the input voltage.

In accordance with one embodiment of the present disclosure, a frequency of the AC component of the first reference voltage is substantially identical to a frequency of the input voltage.

In accordance with one embodiment of the present disclosure, the voltage converter further includes a reference voltage generating module configured to receive a second reference voltage and an AC operating voltage, and generate the first reference voltage according to the second reference voltage and the AC operating voltage. The second reference voltage is a DC voltage.

In accordance with one embodiment of the present disclosure, a voltage level of the output voltage corresponds to a voltage level of the second reference voltage.

In accordance with one embodiment of the present disclosure, a phase of the AC operating voltage is substantially identical to the phase of the input voltage, and a frequency of the AC operating voltage is substantially identical to a frequency of the input voltage.

In accordance with one embodiment of the present disclosure, the reference voltage generating module is configured to generate a reference waveform according to a frequency and a phase of the AC operating voltage, and generate the first reference voltage according to the reference waveform and the second reference voltage. A phase of the reference waveform is substantially opposite to the phase of the input voltage, a frequency of the reference waveform is substantially identical to a frequency of the input voltage, and the reference waveform is substantially identical to a waveform of the input voltage.

In accordance with one embodiment of the present disclosure, the reference voltage generating module includes a phase-locked loop, a waveform generator, an amplitude adjuster, and an adder. The phase-locked loop is configured to acquire a frequency and a phase of the AC operating voltage. The waveform generator is electrically connected to the phase-locked loop, and configured to generate a reference waveform according to the acquired frequency and phase of the AC operating voltage. A phase of the reference waveform is substantially opposite to the phase of the input voltage, a frequency of the reference waveform is substantially identical to a frequency of the input voltage, and the reference waveform is substantially identical to a waveform of the input voltage. The amplitude adjuster is electrically connected to the waveform generator, and configured to adjust an amplitude of the reference waveform. The adder is electrically connected to the amplitude adjuster, and configured to add the reference waveform having the adjusted amplitude and the second reference voltage to generate the first reference voltage.

In accordance with one embodiment of the present disclosure, the voltage converter further includes a reference voltage generating module configured to receive a second reference voltage and the output voltage, and generate the first reference voltage according to the second reference voltage and the output voltage. The second reference voltage is a DC voltage.

In accordance with one embodiment of the present disclosure, the first reference voltage is composed of a DC reference voltage and an AC voltage.

Another aspect of the present disclosure is related to a voltage converting method. In accordance with one embodiment of the present disclosure, the voltage converting method includes converting, through a voltage conversion circuit, an input voltage to an output voltage according to a pulse width modulation signal; subtracting a first reference voltage by the output voltage to generate a feedback signal, wherein a phase of an AC component of the first reference voltage is substantially opposite to a phase of the input voltage; generating a control signal according to the feedback signal; and generating the pulse width modulation signal according to the control signal.

In accordance with one embodiment of the present disclosure, a frequency of the AC component of the first reference voltage is substantially identical to a frequency of the input voltage.

In accordance with one embodiment of the present disclosure, the voltage converting method further includes generating the first reference voltage according to a second reference voltage and an AC operating voltage. The second reference voltage is a DC voltage.

In accordance with one embodiment of the present disclosure, a voltage level of the output voltage corresponds to a voltage level of the second reference voltage.

In accordance with one embodiment of the present disclosure, a phase of the AC operating voltage is substantially identical to the phase of the input voltage, and a frequency of the AC operating voltage is substantially identical to a frequency of the input voltage.

In accordance with one embodiment of the present disclosure, the step of generating the first reference voltage according to the second reference voltage and the AC operating voltage includes acquiring a frequency and a phase of the AC operating voltage, generating a reference waveform according to the acquired frequency and phase of the AC operating voltage, adjusting an amplitude of the reference waveform, and adding the reference waveform having the adjusted amplitude and the second reference voltage to generate the first reference voltage. A phase of the reference waveform is substantially opposite to the phase of the input voltage, a frequency of the reference waveform is substantially identical to a frequency of the input voltage, and the reference waveform is substantially identical to a waveform of the input voltage.

In accordance with one embodiment of the present disclosure, the voltage converting method includes generating the first reference voltage according to a second reference voltage and the output voltage, wherein the second reference voltage is a DC voltage.

In accordance with one embodiment of the present disclosure, the first reference voltage is composed of a DC reference voltage and an AC voltage.

Through an application of one embodiment described above, a ripple voltage on the output voltage can be eliminated. As a result, the operational stability of back end circuits which are electrically connected to the output end can be increased.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
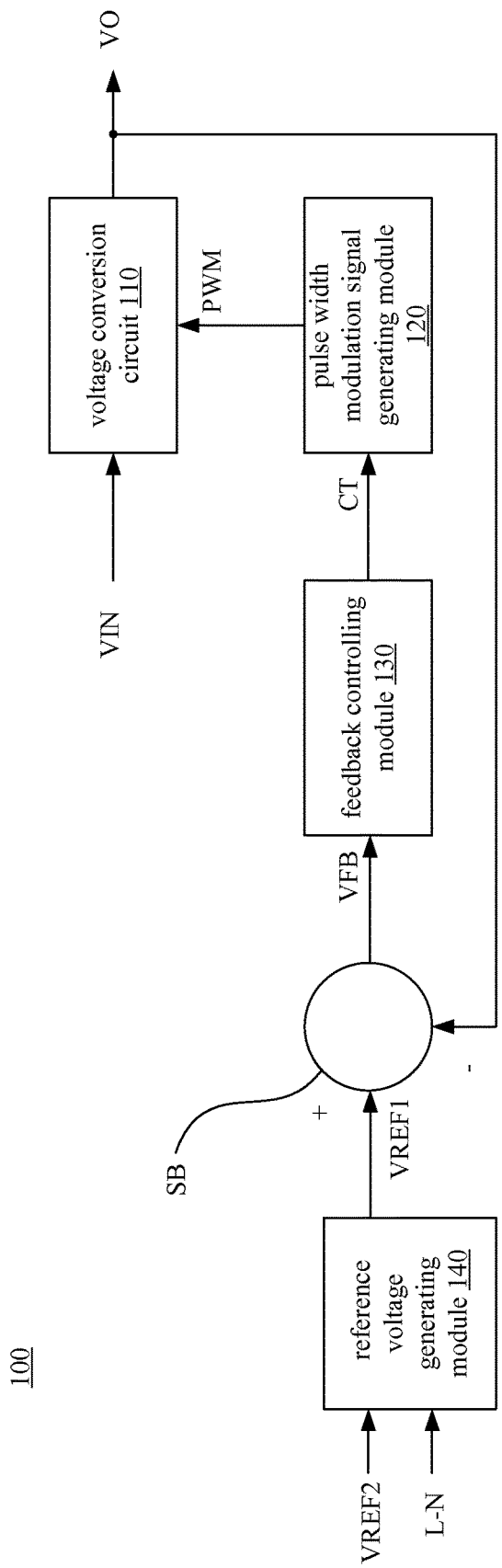
FIG. 1 is a schematic diagram of a voltage converter in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, the range of error to the values modified by the term "substantially" is generally 20%, and it can be 10% in some preferred cases, and moreover, it can also be 5% in some most preferred cases.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

FIG. 1 is a schematic diagram of a voltage converter 100 in accordance with one embodiment of the present disclosure. The voltage converter 100 includes an input end and an output end. The input end is configured to receive an input voltage VIN (e.g., with a voltage level of 400V). The output end is configured to output an output voltage VO (e.g., with a voltage level of 12V). The voltage converter 100 is configured to convert the input voltage VIN to the output voltage VO. In one embodiment, the input voltage VIN can be a mains supply voltage.

In this embodiment, the voltage converter 100 includes a voltage conversion circuit 110, a pulse width modulation signal generating module 120, a feedback controlling module 130, a reference voltage generating module 140, and a subtractor SB. In this embodiment, the voltage conversion circuit 110 is electrically connected to the pulse width modulation signal generating module 120 and the subtractor SB. The pulse width modulation signal generating module 120 is electrically connected to the feedback controlling module 130. The feedback controlling module 130 is electrically connected to the subtractor SB. The reference voltage generating module 140 is electrically connected to the subtractor SB.

In this embodiment, all of the voltage conversion circuit 110, the pulse width modulation signal generating module 120, the feedback controlling module 130, the reference voltage generating module 140, and the subtractor SB can be realized by hardware circuits. In various embodiments, the functions of the pulse width modulation signal generating module 120, the feedback controlling module 130, the reference voltage generating module 140, and the subtractor SB may be realized by a computer program which is stored in a computer readable storage medium and implemented by a processor. The processor can be realized by, for example, a central processing unit (CPU), a digital signal processor (DSP), a micro processor, or another suitable computing component. The computer readable storage medium can be realized by, for example, a ROM (read-only memory), a flash memory, a floppy disc, a hard disc, an optical disc, a flash disc, a tape, a database accessible from a network, or another suitable storage component.

In this embodiment, the voltage conversion circuit 110 is configured to receive a pulse width modulation signal PWM and the input voltage VIN, and convert the input voltage VIN to the output voltage VO according to the pulse width modulation signal PWM. In one embodiment, the voltage conversion circuit 110 may be realized by using a DC-to-DC voltage conversion circuit 110.

In this embodiment, the pulse width modulation signal generating module 120 is configured to receive a control signal CT and generate the pulse width modulation signal PWM according to the control signal CT. In one embodiment, the pulse width modulation signal generating module 120 may be realized by using a pulse width modulator (PWM), a pulse frequency modulator (PFM), or a fixed pulse width modulator (FPWM).

In this embodiment, the feedback controlling module 130 is configured to receive a feedback signal VFB and generate the control signal CT according to the feedback signal VFB. In one embodiment, the feedback controlling module 130 may be realized by using a commonly used P controller, a PI controller, a 2p2z controller, a 3p3z controller, and/or a low-pass filter.

In this embodiment, the subtractor SB is configured to receive a first reference signal VREF1 and the output voltage VO, and subtract the first reference voltage VREF1 by the output voltage VO to generate the feedback signal VFB. That is, the voltage level of the feedback signal VFB may be substantially equal to the voltage level difference between the output voltage VO and the first reference voltage VREF1. The feedback controlling module 130 can control the pulse width modulation signal PWM generated by the pulse width modulation signal generating module 120 according to the voltage level difference between the output voltage VO and the first reference voltage VREF1, so as to raise or reduce the output voltage VO.

Figure 2:
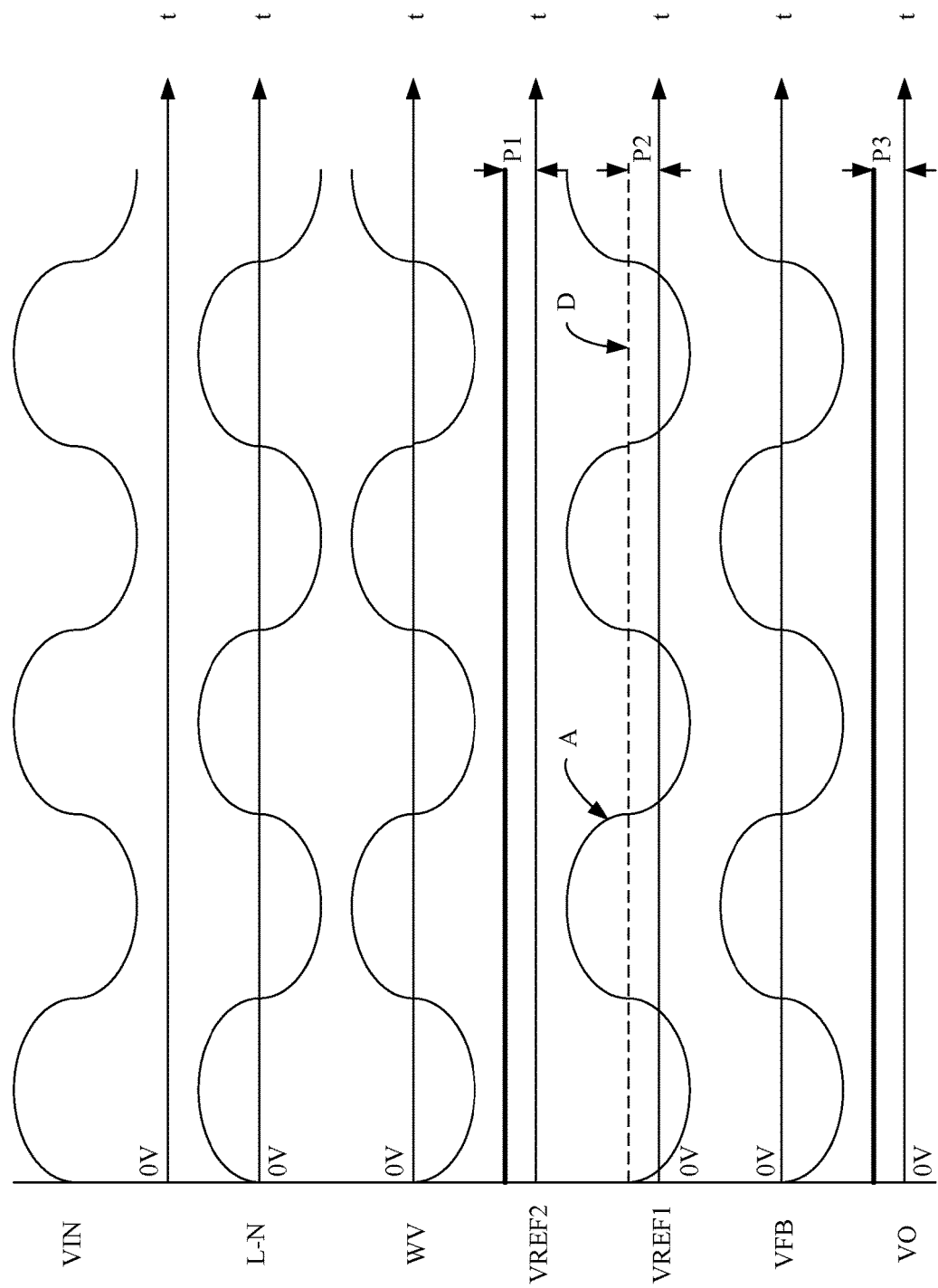
FIG. 2 illustrates signals corresponding to the voltage converter in accordance with one embodiment of the present disclosure.

In this embodiment, the reference voltage generating module 140 is configured to receive a second reference voltage VREF2 and an operating voltage L-N, and generate the first reference voltage VREF1 according to the second reference voltage VREF2 and the operating voltage L-N. In one embodiment, the first reference voltage VREF1 may be composed of a DC reference voltage (e.g., a DC component D of the first reference voltage VREF1 as shown in FIG. 2) and an AC voltage (e.g., an AC component A of the first reference voltage VREF1 as shown in FIG. 2). The phase of the AC component A of the first reference voltage VREF1 is substantially opposite to the phase of the input voltage VIN, and the frequency of the AC component A of the first reference voltage VREF1 is substantially identical to the frequency of the input voltage VIN. In one embodiment, the second reference voltage VREF2 is a DC voltage, and the operating voltage L-N is an AC voltage. In one embodiment, the voltage level of the output voltage VO corresponds to the voltage level of the second reference voltage VREF2. In one embodiment, the frequency and the phase of the operating voltage L-N are substantially identical to the frequency and the phase of the input voltage VIN. In one embodiment, the operating voltage L-N may be a sample voltage of mains supply.

In some approaches, the first reference voltage VREF1 may be a pure DC voltage. In such a case, the voltage level of the output voltage VO is varied in a manner corresponding to the swaying of the input voltage VIN and a ripple voltage is accordingly generated (as shown in FIG. 4A). The frequency and the phase of the ripple voltage are substantially identical to the frequency and the phase of the input voltage VIN.

Figure 4B:
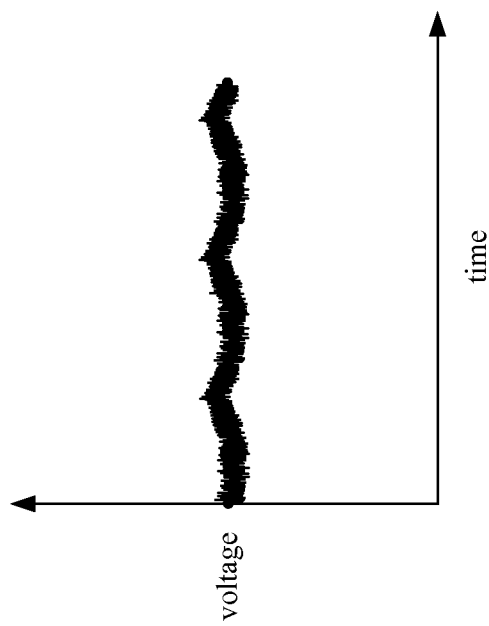
FIG. 4B illustrates a measured output voltage of the voltage converter in accordance with one embodiment of the present disclosure.
Figure 4A:
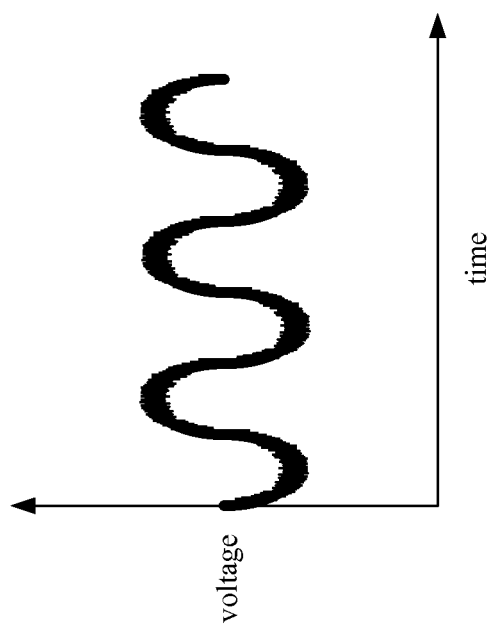
FIG. 4A illustrates a measured output voltage of a voltage converter in accordance with one comparative example.

In contrast, in this embodiment, since the first reference voltage VREF1 has the AC component A with the phase being substantially opposite to the phase of the input voltage VIN and with the frequency being substantially identical to the frequency of the input voltage VIN, the voltage level of the output voltage VO is varied in a manner corresponding to both of the AC component A of the first reference voltage VREF1 and the input voltage VIN which have opposite phases and the same frequencies, so that the effects to the output voltage VO caused by the AC component A of the first reference voltage VREF1 and the input voltage VIN are counteracted (as shown in FIG. 4B).

Through the configuration described above, the ripple voltage on the output voltage VO can be eliminated, such that the operational stability of back end circuits which are electrically connected to the output end can be increased.

Referring to FIG. 2, which illustrates signals corresponding to the voltage converter 100 in accordance with one embodiment of the present disclosure, the frequency and the phase of the operating voltage L-N are substantially identical to the frequency and the phase of the input voltage VIN. The phase of the AC component A of the first reference voltage VREF1 is substantially opposite to the phase of the input voltage VIN, and the frequency of the AC component A of the first reference voltage VREF1 is substantially identical to the frequency of the input voltage VIN. The voltage level P2 of the DC component D of the first reference voltage VREF1 is substantially identical to the voltage level P1 of the second reference voltage VREF2. The voltage level of the feedback signal VFB is substantially equal to the voltage level difference between the output voltage VO and the first reference voltage VREF1. The second reference voltage VREF2 is a DC voltage, and the voltage level P3 of the output voltage VO corresponds to the voltage level P1 of the second reference voltage VREF2. In one embodiment, the voltage level P3 of the output voltage VO is substantially equal to the voltage level P1 of the second reference voltage VREF2.

Figure 3:
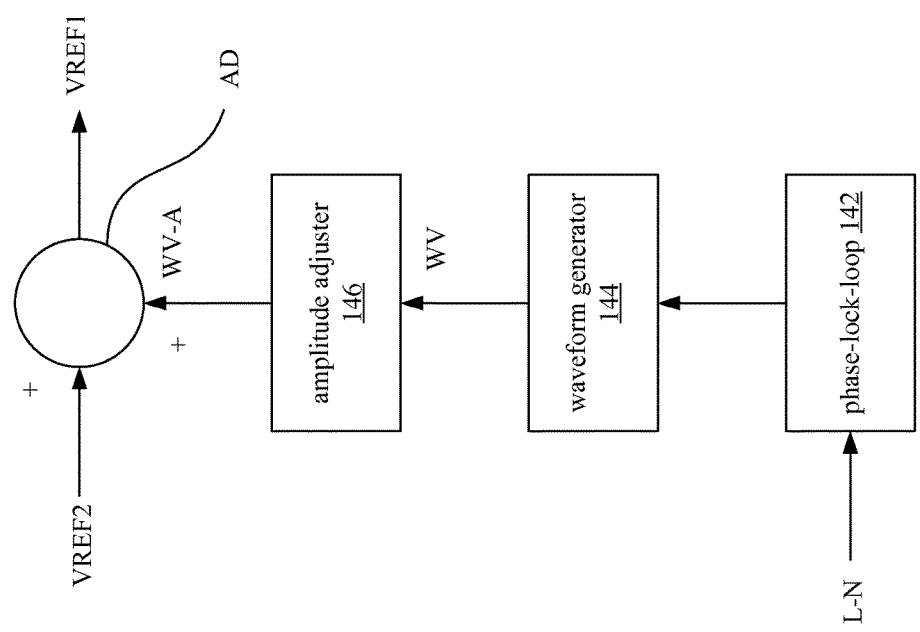
FIG. 3 is a schematic diagram of a reference voltage generating module in accordance with one embodiment of the present disclosure.

FIG. 3 is a schematic diagram of the reference voltage generating module 140 in accordance with one embodiment of the present disclosure. In this embodiment, the reference voltage generating module 140 includes a phase-locked loop 142, a waveform generator 144, an amplitude adjuster 146, and an adder AD. The phase-locked loop 142 is electrically connected to the waveform generator 144. The waveform generator 144 is electrically connected to the amplitude adjuster 146. The amplitude adjuster 146 is electrically connected to the adder AD.

In this embodiment, the phase-locked loop 142 is configured to receive the operating voltage L-N and acquire the frequency and the phase of the operating voltage.

In this embodiment, the waveform generator 144 is configured to generate a reference waveform WV according to the acquired frequency and phase of the operating voltage. The phase of the reference waveform WV is substantially opposite to the phases of the input voltage VIN and the operating voltage L-N. The frequency of the reference waveform WV is substantially identical to the frequencies of the input voltage VIN and the operating voltage L-N. The reference waveform WV is substantially identical to the waveform of the input voltage VIN. For example, under a condition that the waveform of the input voltage VIN is a sine wave, the reference waveform WV is a sine wave with an opposite phase.

In this embodiment, the amplitude adjuster 146 is configured to receive the reference waveform WV, and adjust (e.g., amplify or reduce) the amplitude of the reference waveform WV to generate a reference waveform with an adjusted amplitude WV-A. In one embodiment, the amplitude adjuster 146 may be realized by an amplifier. It should be noted that the gain of the amplitude adjuster 146 can be determined on the basis of actual requirements.

In this embodiment, the adder AD is configured to receive the reference waveform having the adjusted amplitude WV-A and the second reference voltage VREF2, and add the reference waveform having the adjusted amplitude WV-A to the second reference voltage VREF2 to generate the first reference voltage VREF1.

Through the configuration described above, the reference voltage generating module 140 can be realized by using hardware circuits. However, it should be noted that, in a different embodiment, the functions of the phase-locked loop 142, the waveform generator 144, the amplitude adjuster 146, and the adder AD may be realized by a computer program which is stored in a computer readable storage medium and implemented by a processor, and the present disclosure is not limited to the embodiment disclosed above.

FIG. 4A illustrates a measured output voltage of a voltage converter in accordance with one comparative example. FIG. 4B illustrates a measured output voltage VO of the voltage converter 100 in accordance with one embodiment of the present disclosure. Notably, by utilizing the voltage converter 100 in one embodiment of the present disclosure, the ripple voltage on the output voltage VO can be eliminated, such that the operational stability of back end circuits which are electrically connected to the output end of the voltage converter 100 can be increased.

Figure 5:
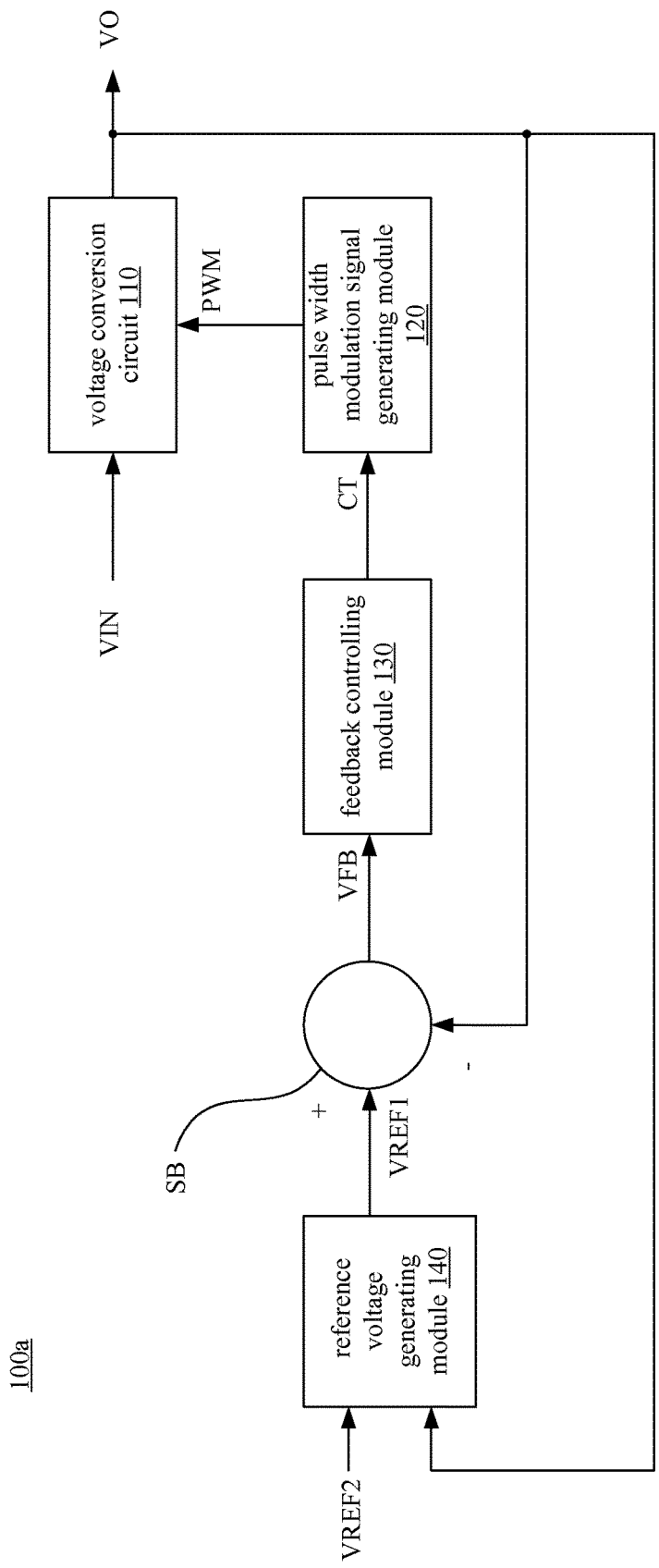
FIG. 5 is a schematic diagram of a voltage converter in accordance with another embodiment of the present disclosure.

FIG. 5 is a schematic diagram of a voltage converter 100a in accordance with another embodiment of the present disclosure. The voltage converter 100a includes a voltage conversion circuit 110, a pulse width modulation signal generating module 120, a feedback controlling module 130, a reference voltage generating module 140, and a subtractor SB. It should be noted that the voltage converter 100a is substantially similar to the voltage converter 100 in the previous embodiment. The main difference is that, in this embodiment, the reference voltage generating module 140 of the voltage converter 100a generates the first reference signal VREF1 according to the output voltage VO and instead of according to the operating voltage L-N. Hence, a description of many aspects that are similar will not be repeated.

Through the configuration described above, the reference voltage generating module 140 can generate the first reference voltage VREF1 with the phase of the AC component A thereof being substantially opposite to the phase of the input voltage VIN. In such a manner, the ripple voltage on the output voltage VO can be eliminated, such that the operational stability of back end circuits which are electrically connected to the output end of the voltage converter 100a can be increased.

Another aspect of the present disclosure is related to a voltage converting method. The voltage converting method can be applied to a voltage converter having a structure that is the same as or similar to the structure of the voltage converters 100, 100a shown in FIG. 1 and FIG. 5. To simplify the description below, in the following paragraphs, the embodiment shown in FIG. 1 will be used as an example to describe the voltage converting method according to an embodiment of the present disclosure. However, the present disclosure is not limited to application to the embodiment shown in FIG. 1.

In addition, it should be noted that in the steps of the following voltage converting method, no particular sequence is required unless otherwise specified. Moreover, the following steps also may be performed simultaneously or the execution times thereof may at least partially overlap.

Furthermore, the steps of the following voltage converting method may be added to, replaced, and/or eliminated as appropriate, in accordance with various embodiments of the present disclosure.

Figure 6:
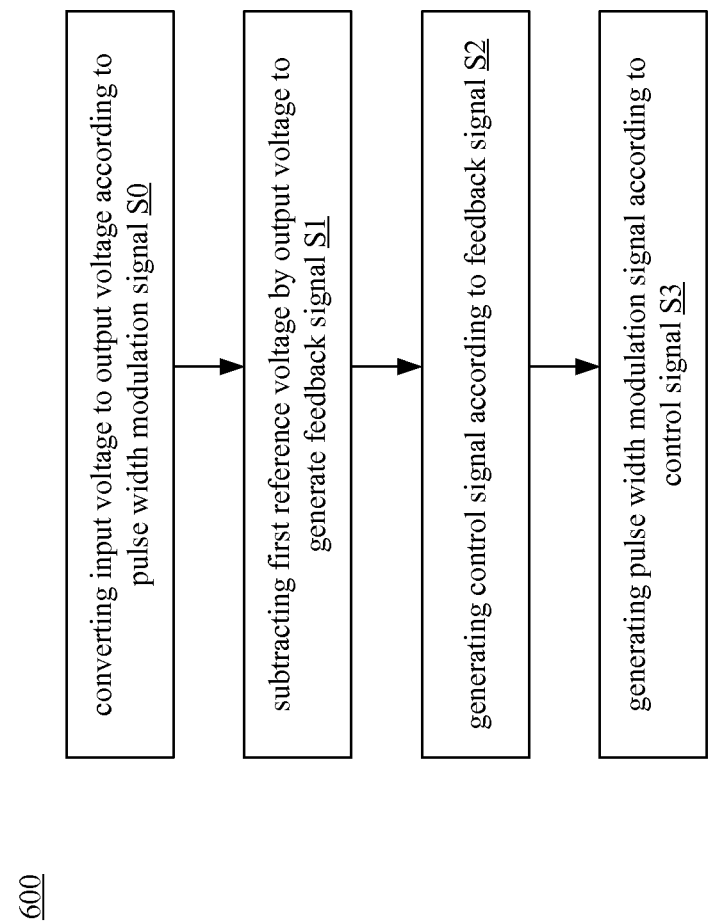
FIG. 6 is a flowchart of a voltage converting method in accordance with one embodiment of the present disclosure.

FIG. 6 is a flowchart of a voltage converting method 600 in accordance with one embodiment of the present disclosure.

In step S0, through the voltage conversion circuit 110, an input voltage VIN is converted to an output voltage VO according to a pulse width modulation signal PWM.

In step S1, through the subtractor SB, a first reference voltage VREF1 is subtracted by the output voltage VO to generate a feedback signal VFB. In one embodiment, the first reference voltage VREF1 may be composed of a DC reference voltage and an AC voltage. The phase of the AC component A of the first reference voltage VREF1 is substantially opposite to the phase of the input voltage VIN, and the frequency of the AC component A of the first reference voltage VREF1 is substantially identical to the frequency of the input voltage VIN.

In step S2, through the feedback controlling module 130, a control signal CT is generated according to the feedback signal VFB.

In step S3, through the pulse width modulation signal generating module 120, the pulse width modulation signal PWM is generated according to the control signal CT, so that the voltage conversion circuit 110 is able to convert the input voltage VIN to the output voltage VO according to this pulse width modulation signal PWM.

Through the configuration described above, the ripple voltage on the output voltage VO can be eliminated, such that the operational stability of back end circuits which are electrically connected to the output end of the voltage converter 100 can be increased.

It should be noted that details in association with steps S0-S3 can be ascertained by referring to the paragraphs described above, and a description in this regard will not be repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A voltage converter comprising:
   a voltage conversion circuit configured to receive a pulse width modulation signal and convert an input voltage to an output voltage according to the pulse width modulation signal;
   a pulse width modulation signal generating module coupled to the voltage conversion circuit, wherein the pulse width modulation signal generating module is configured to receive a control signal and generate the pulse width modulation signal according to the control signal, wherein the pulse width modulation signal is configured to raise or reduce the output voltage;
   a feedback controlling module coupled to the pulse width modulation signal generating module, wherein the feedback controlling module is configured to receive a feedback signal and generate the control signal according to the feedback signal; and
   a subtractor coupled to the voltage conversion circuit and the feedback controlling module, wherein the subtractor is configured to receive a first reference voltage and the output voltage, and subtract the first reference voltage by the output voltage to generate the feedback signal,
   wherein a phase of an AC component of the first reference voltage is substantially opposite to a phase of the input voltage, a wave crest of the first reference voltage is synchronized with a wave trough of the input voltage, and a wave trough of the first reference voltage is synchronized with a wave crest of the input voltage.

2. The voltage converter as claimed in claim 1, wherein a frequency of the AC component of the first reference voltage is substantially identical to a frequency of the input voltage.

3. The voltage converter as claimed in claim 1 further comprising:
   a reference voltage generating module configured to receive a second reference voltage and an AC operating voltage, and generate the first reference voltage according to the second reference voltage and the AC operating voltage, wherein the second reference voltage is a DC voltage.

4. The voltage converter as claimed in claim 3, wherein a voltage level of the output voltage corresponds to a voltage level of the second reference voltage.

5. The voltage converter as claimed in claim 3, wherein a phase of the AC operating voltage is substantially identical to the phase of the input voltage, and a frequency of the AC operating voltage is substantially identical to a frequency of the input voltage.

6. The voltage converter as claimed in claim 3, wherein the reference voltage generating module is configured to generate a reference waveform according to a frequency and a phase of the AC operating voltage, and generate the first reference voltage according to the reference waveform and the second reference voltage, wherein a phase of the reference waveform is substantially opposite to the phase of the input voltage, a frequency of the reference waveform is substantially identical to a frequency of the input voltage, and the reference waveform is substantially identical to a waveform of the input voltage.

7. The voltage converter as claimed in claim 3, wherein the reference voltage generating module comprises:
   a phase-locked loop configured to acquire a frequency and a phase of the AC operating voltage;
   a waveform generator coupled to the phase-locked loop, and configured to generate a reference waveform according to the acquired frequency and phase of the AC operating voltage, wherein a phase of the reference waveform is substantially opposite to the phase of the input voltage, a frequency of the reference waveform is substantially identical to a frequency of the input voltage, and the reference waveform is substantially identical to a waveform of the input voltage;
   an amplitude adjuster coupled to the waveform generator, and configured to adjust an amplitude of the reference waveform; and
   an adder coupled to the amplitude adjuster, and configured to add the reference waveform having the adjusted amplitude and the second reference voltage to generate the first reference voltage.

8. The voltage converter as claimed in claim 1 further comprising:
   a reference voltage generating module configured to receive a second reference voltage and the output voltage, and generate the first reference voltage according to the second reference voltage and the output voltage, wherein the second reference voltage is a DC voltage.

9. The voltage converter as claimed in claim 1, wherein the first reference voltage is composed of a DC reference voltage and an AC voltage.

10. A voltage converting method comprising:
    converting, through a voltage conversion circuit, an input voltage to an output voltage according to a pulse width modulation signal, wherein the pulse width modulation signal is configured to raise or reduce the output voltage;
    subtracting a first reference voltage by the output voltage to generate a feedback signal, wherein a phase of an AC component of the first reference voltage is substantially opposite to a phase of the input voltage, a wave crest of the first reference voltage is synchronized with a wave trough of the input voltage, and a wave trough of the first reference voltage is synchronized with a wave crest of the input voltage;
    generating a control signal according to the feedback signal; and
    generating the pulse width modulation signal according to the control signal.

11. The voltage converting method as claimed in claim 10, wherein a frequency of the AC component of the first reference voltage is substantially identical to a frequency of the input voltage.

12. The voltage converting method as claimed in claim 10 further comprising:
    generating the first reference voltage according to a second reference voltage and an AC operating voltage, wherein the second reference voltage is a DC voltage.

13. The voltage converting method as claimed in claim 12, wherein a voltage level of the output voltage corresponds to a voltage level of the second reference voltage.

14. The voltage converting method as claimed in claim 12, wherein a phase of the AC operating voltage is substantially identical to the phase of the input voltage, and a frequency of the AC operating voltage is substantially identical to a frequency of the input voltage.

15. The voltage converting method as claimed in claim 12, wherein the step of generating the first reference voltage according to the second reference voltage and the AC operating voltage comprises:
   acquiring a frequency and a phase of the AC operating voltage;
   generating a reference waveform according to the acquired frequency and phase of the AC operating voltage, wherein a phase of the reference waveform is substantially opposite to the phase of the input voltage, a frequency of the reference waveform is substantially identical to a frequency of the input voltage, and the reference waveform is substantially identical to a waveform of the input voltage;
   adjusting an amplitude of the reference waveform; and
   adding the reference waveform having the adjusted amplitude and the second reference voltage to generate the first reference voltage.

16. The voltage converting method as claimed in claim 10 further comprising:
   generating the first reference voltage according to a second reference voltage and the output voltage, wherein the second reference voltage is a DC voltage.

17. The voltage converting method as claimed in claim 10, wherein the first reference voltage is composed of a DC reference voltage and an AC voltage.

* * * * *